United States Patent [19]

Ohno et al.

[11] Patent Number: 4,587,209
[45] Date of Patent: May 6, 1986

[54] OPTICAL INFORMATION RECORDING MEMBER COMPRISING AU, TEO2 AND TE

[75] Inventors: Eiji Ohno, Neyagawa; Kunio Kimura; Noboru Yamada, both of Hirakata; Nobuo Akahira, Yawata, all of Japan

[73] Assignee: Matsushita Electric Industrial Co., Ltd., Osaka, Japan

[21] Appl. No.: 715,395

[22] Filed: Mar. 25, 1985

[30] Foreign Application Priority Data

Mar. 28, 1984 [JP] Japan .................................. 59-61463
Jun. 14, 1984 [JP] Japan ................................ 59-122370

[51] Int. Cl.$^4$ .......................... G03C 1/72; G03C 1/94
[52] U.S. Cl. .................................. 430/526; 346/76 L; 346/135.1; 365/113; 430/346; 430/495; 430/524; 430/945; 430/964
[58] Field of Search ............... 430/526, 495, 346, 945, 430/524; 346/76 L, 135.1; 365/113

[56] References Cited

U.S. PATENT DOCUMENTS 3,971,874  7/1976  Ohta et al. ........................... 430/495
4,278,734  7/1981  Ohta et al. ........................... 430/495
4,385,376  5/1983  Takaoka et al. ..................... 430/945
4,403,231  9/1983  Ando et al. ........................... 430/346

FOREIGN PATENT DOCUMENTS

46317   4/1975  Japan .
46318   4/1975  Japan .
46319   4/1975  Japan .
38616   3/1980  Japan .
163638 12/1980  Japan .

Primary Examiner—Richard L. Schilling
Attorney, Agent, or Firm—Stevens, Davis, Miller & Mosher

[57] ABSTRACT

Disclosed is an optical information recording member which permits recording of optical information at a high speed and high density by means of energy of light or heat, as well as a high speed reproduction of the recorded information. The optical information recording member has a thin film formed on a substrate which thin film is made of TeOx constituted by a mixture of Te and TeO2 with a small amount of Au being added such that the contents of Te, O and Au in the thin film falls within a predetermined region limited in terms of atomic percent. The optical information recording member of the invention having the thin film of Te-O-Au system permits the information to be recorded in quite a short time thus allowing quite high speed of recording and reproduction as compared with the conventional recording film of TeOx system. The optical information recording member of the invention also brings about a higher recording sensitivity and a higher C/N ratio. Further, the optical information recording member may have a thermal diffusion layer of a metal having a higher heat conductivity than the thin film, formed on at least one side of the recording thin film, thereby making uniform and stabilizing the recording bits. In consequence, undesirable distortion of the recording bits is prevented even when an excessively large recording power is irradiated, thus affording a wider adaptability of the optical information recording member.

9 Claims, 10 Drawing Figures

OPTICAL INFORMATION RECORDING MEMBER COMPRISING AU, TEO$_2$ AND TE

BACKGROUND OF THE INVENTION

1. Field of the Invention:

The present invention relates to an optical information recording member which permits a quick recording of optical information at a high density, as well as quick reproduction of the recorded information, by use of light or heat etc.

2. Description of the Prior Art:

There have been publicly known techniques for effecting highly dense recording and reproduction of information by means of laser beam. One of these known techniques employs a recording medium having a thin film essentially comprising TeOx ($0<x<2$) which is a mixture of Te and TeO$_2$. Such recording medium is shown in Japanese Patent Laid-Open Publication Nos. 46317/1975, 46318/1975 and 46319/1975, as well as in the specification of the U.S. Pat. No. 3,971,874. In the production of this type of recording medium, PbOx ($0<x<1$), SbOx($0<x<1.5$) or VOx ($0<x<2.5$) are used as additives. This recording medium can obtain, when scanned with a reproducing light beam, a large change in the transmittance.

However, there is a practical limit in the power of the laser beam source, particularly when there is a demand for miniaturization and simplification of a recording/reproducing device. The recording medium having thin film essentially comprising TeOx ($0<x<2$) cannot exhibit sufficient sensitivity, when a compact He-Ne laser or laser diode of about 20 mW power is used for effecting the recording/reproducing. When the reproduction is made by virtue of the amount of lange in the quantity of light reflected by the medium, this type of recording medium can not obtain a sufficient amount of change in the quantity of the reflected light.

In order to obviate the above-described problems of the prior art, it has been attempted to lower the threshold temperature for the change of state, by adding a suitable additive of a low melting point to the TeOx ($0<x<2$) which is the major material of the recording medium. For instance, it has been attempted to add TlOx ($0<x<1.5$), typically Tl$_2$O having a melting point of 300° C., as proposed in Japanese Patent Laid-Open Publication No. 38616/1980.

On the other hand, it has been proposed to increase the refractive index of the medium so as to obtain a greater amount of change in the optical property caused due to change in the state. To this end, it has been attempted to add an additive which has both large ion polarizability and high density such as BiOx or InOx ($0<x<1.5$), as proposed in Japanese Patent Laid-Open Publication Nos. 38616/1980 and 163638/1980. Owing to these improvements, nowadays, it becomes possible to effect recording and reproduction of information by means of a laser diode.

On the other hand, the current progress in the information-utilizing society requires a higher speed of transmission of information, which in turn requires a higher speed of recording and reproduction of information and, accordingly, a higher recording sensitivity.

SUMMARY OF THE INVENTION

Accordingly, an object of the invention is to improve the optical recording medium having the thin film of TeOx which is a mixture of TeO$_2$ and Te, in such a way as to remarkably improve the recording speed and recording sensitivity, while preserving the advantages of the TeOx type recording film such as, for example, anti-humid property.

According to the invention, the above-mentioned object is achieved by adding a small amount of Au to the material of the TeOx film.

Figure 1:
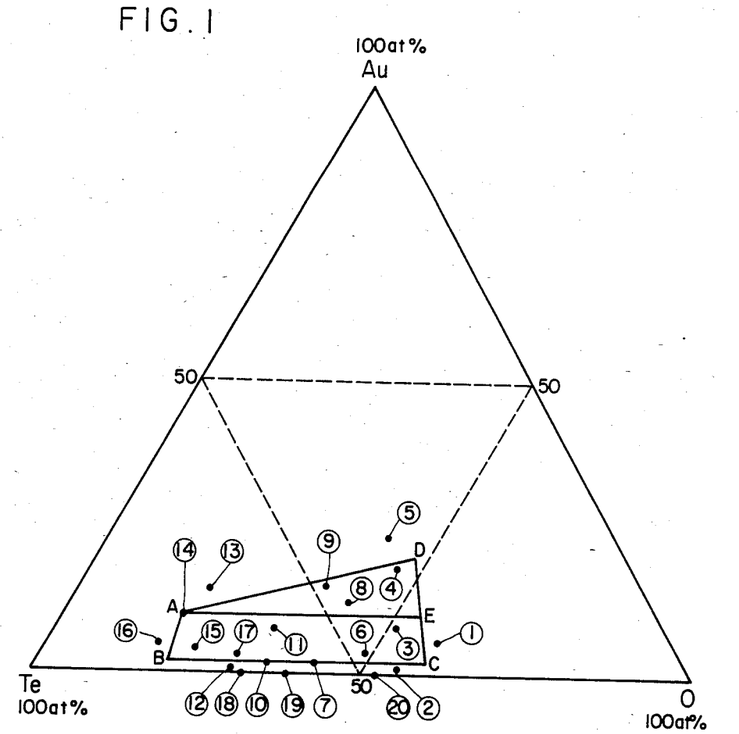
FIG. 1 is a composition diagram of the Te-O-Au material used as the material of the recording film of an optical information recording member embodying the invention, showing the effective regions of Te, O and Au contents.

Briefly, the optical information recording member embodying the invention has a thin optical recording film formed on a substrate and constituted essentially by three elements of Te, O and Au, the contents of Te, O and Au in atomic percent falling within the region defined by lines connecting the points A, B, C and D.

The optical information recording member of the invention brings about superior recording speed, recording sensitivity and C/N ratio as compared with the conventional optical information recording member of the type having a thin film of TeOx, and exhibits a superior anti-humid property.

In the optical information recording member of the invention, there is provided on a substrate an optical information recording thin film constituted by at least three elements of Te, O and Au the ratio in atomic number of which three elements exists in a range defined by A, B, C and D shown in FIG. 1, with the result that the recording speed, recording sensitivity, and C/N ratio of the optical information recording member of the present invention are improved very much in comparison with conventional optical information recording members having TeOx thin film and at the same time holds superior anti-humid property.

Further, in the present invention, there may be provided on either one or both of the TeO-Au recording layer surfaces a thermal diffusion layer made of a metal having a greater thermal conductivity than the Te-O-Au recording layer, e.g., Al, Au, Ni or Pd. This thermal diffusion layer contributes to the uniformity and stabilization of the recording bits and minimizes the undesirable distortion of the recording bits even when an unnecessarily large recording power is inputted, thereby attaining a good quality of the reproduced signals.

DESCRIPTION OF THE PREFERRED EMBODIMENTS

Thin film of TeOx which is a mixture of TeO$_2$ and Te exhibits a change in the optical constants and changes its color into black when irradiated with a light beam of a high density such as a laser beam etc. Recording and reproduction of information is conducted by making an efficient use of this phenomenon. This phenomenon is considered to be based on an optical change caused by a change in the state of Te crystals in the film, i.e., the growth of the crystals, through the process of irradiation with beam, absorption of energy and temperature rise. Thus, in order to increase the recording speed, it is important to find out means as to how the change in the Te crystal is finished in short time. In the conventional TeO$x$-type thin film, when the change of Te crystal grains occurs at the time of recording, there has been reeded somewhat long period time for finishing the change of Te grains into a stable crystal state, because of the existence of TeO$_2$ herein. This conventional recording member does not cause any problem when the information to be recorded is, for example, visual images. In the case where a high response speed is required as in the case of the memory disks for computer, however, the design of the system such as the computer is undesirably limited due to the relatively long period of time required in the recording when using the conventional recording member.

For improving the above problem, the present invention provides an information recording member having a thin film formed on the substrate, the thin film being made by adding a small amount of Au to TeO$x$ which is a mixture of Te and TeO$_2$, in such a manner as the contents of Te, O and Au in atomic percent falls within the region defined by lines connecting the points A, B, C and D in FIG. 1, with the result that the recording can be finished in a very short period of time in comparison with the conventional TeO$x$ type recording thin film.

Hitherto, proposals have been made to add a third substance to Te or to a mixture of Te and TeO$_2$ for the purpose of improving the optical recording characteristics. These substances, however, are limited only to such elements as having relatively high covalent bonding property and capable of easily forming a glassy state when added to a mixture of Te and TeO$_2$. Examples of such substance are Ge, Sn, Pb, Si, Sb and Se. According to the invention, Au is specifically selected from the group of elements of Au, Ag, Cu and etc. which exhibit high metallic bonding property. The specific effect of addition of Au is brought about exclusively only when the contents of Te, O and Au in atomic percent falls within the above-specified region. The function of Au in the present invention is deemed to reside in the matter described below.

Au is considered to promote the change of the state of Te in the TeO$x$ thin film during the recording, that is, functioning as nucleous of crystal, and it is expected to bring about a sperior advantageous effect regarding a high recording speed by adding a relatively small amount of Au. The matter that the change of the state of Te is finished in short time during the recording suggests that, considering that the lazer-irradiated portion of the recording film is locally softened or molten, the state of change is accomplished while the viscosity of the film is small and, hence, suggests that the crystal grains of Te having higher degree of crystallization can be obtained, with the result that it is considered that the greater change in the reflectivity of the reproducing light and the high C/N ratio are obtained. Further, the light absorption efficiency of TeO$x$ is increased by addition of Au, so that it becomes possible to effect the writing of information with lower power of laser beam. It is considered also that the excellent anti-humid property of TeO$x$ is never impaired by the addition of Au, because Au inherently has a superior anti-oxidation property.

An explanation will be made hereinunder as to the reason why the amount of addition of Au is restricted to the region defined by the lines connecting the points A, B, C and D in FIG. 1. The basis or reasons of determination of these points A, B, C and D will be detailed later in connection with the description of Embodiment 1.

Referring to FIG. 1, the Te content is relatively very large and the O contents is very small in the area which is on the left side of the straight line AB. This means that the film is rich in Te but poor in TeO$_2$. The function of TeO$_2$ in the film is to prevent the occurrence of an easy change of state of Te at room temperature, while protecting Te against oxidation under the presence of humidity. It proved, however, that the area which is on the right side of the line AB is preferably used in the T-O-Au thin film, from the view point of stability of the recording thin film structure. On the other hand, the Te content is small while O content is large in the area which is on the right side of the line CD. This means that the thin film having a composition in this area is rich in TeO$_2$ but poor in Te. Since the recording in the recording thin film of the invention makes use of a change of the state of Te, the light absorption efficiency of the recording thin film is lowered and the change of optical density is insufficient due to reduction of the formation of the Te crystal grains during the recording, when the Te content of the thin film becomes small. Practically sufficient degree of recording sensitivity and change in optical property were obtained when the Te-O-Au thin film had a composition falling in the area which is on the left side of the line CD.

An explanation will be made hereinunder as to the preferred amount of addition of Au. In the area between the points C and D in FIG. 1, the light absorption efficiency and, hence, the recording sensitivity are enhanced by addition of Au to the TeO$x$ thin film. However, an addition of excessive Au may cause a relative reduction of Te content in the film, resulting in a reduction of the reflectivity measured before and after the recording. Therefore, in the area rich in TeO$_2$ the composition having Au content higher than that at the point D cannot be used practically from the view point of change in the quantity of the reflected light. In the area between the point B and the point A, the film has a sufficiently high Te content. Therefore, if the amount of addition of Au which promotes the state change of Te, i.e., growth of crystal grains, is too large, the change of the state of Te is apt to occur even at the room temperature, thus imparing the stability of the recording thin film. In addition, since Au itself exhibits a high metal bonding ability the thin film can hardly exists in amorphous state when the amount of Au is excessively added. Further, in the case of adding excessive amount of Au, the anti-humid property is also deteriorated because of reduction of the O content, i.e., reduction of relative amount of TeO$_2$ in the thin film. Furthermore, if an excessive amount of Au is added regarding a region where the Te content is high, the reflectivity of the thin film in a non-recorded state becomes very large, so that the sensitivity is lowered and the amount of change in the reflectivity measured before and after the recording becomes small, with the result that it becomes impossible to obtain high C/N ratio. Therefore, in the area where the Te content is high, addition of Au in excess of the amount at the point A is not preferred because of the fear of impairing stability of the recording thin film and reduction of the C/N ratio. The Au can remarkably reduce a period of time required for the change of the state of Te, even when its content is small. However, in the area below the line BC where the Au content is extremely small, the amount of crystal nucleous becomes so small that the high-speed recording, which is the principal object of the invention, cannot be achieved. For these reasons, the contents of Te, O and Au in atomic percent in the recording thin film of the recording member of the invention is selected to fall within the region which is defined by lines connecting the points A, B, C and D in FIG. 1. The coordinate values of the points A to E in FIG. 1 are as follows:
(Te, O, Au) at %
A: (72, 18, 10)
B: (78, 20, 2)
C: (39, 59, 2)
D: (32, 48, 20)
E: (36, 54, 10).

Because of the reasons stated above, the optical information recording member of the invention allows the recording to be completed in a short period of time and brings about a high sensitivity and high C/N ratio, while maintaining the high anti-humid property peculiar to the Te-O-Au thin film.

The invention will be described in detail hereinunder with reference to the accompanying drawings.

Figure 2:
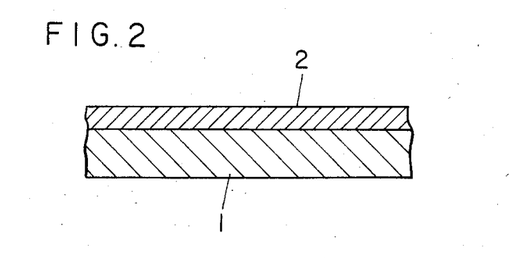
FIGS. 2 and 4a, 4b and 4c are sectional views of essential parts of an optical information recording member embodying the invention.

Referring now to FIG. 2 which is a sectional view of an optical information recording member embodying the invention, a numeral 1 denotes a substrate which may be made of a metal such as aluminum and copper, a glass such as quartz glass, pyrex glass, soda glass, or a resin such as ABS resin, polystyrene, acrylic resin, vinyl chloride etc. Acetate, tefron, polyester or the like material can be used as the material of transparent film. Among these materials, polyester film and acrylic resin have superior transparency and, hence, is effective in the optical reproduction of the signal image.

A reference numeral 2 denotes a recording thin film which is formed on the substrate 1 by evaporation or sputtering. The evaporation may be done either by a method such as resistance heating in which heat is applied externally or by a direct heating of the specimen as in the case of an electron beam heating. From the view point of controllability and mass-producibility, however, the method employing an electron beam is preferred. A description will be made hereinunder as to the method in which a thin film made of three elements of Te, O and Au is formed on the substrate by means of the electron beam process.

Although theoretically there is formed a mixture of Te, O and Au on the substrate, practically there is formed a mixture of Te, $TeO_2$ and Au. The $TeO_2$, Te and Au are evaporated from respective sources of an evaporation apparatus of tripple evaporation source type. When an evaporation apparatus of dual evaporation source type is used, Au is evaporated from a first evaporation source, while $TeO_2$ and Te are simultaneously evaporated from a second evaporation source by use of a material prepared by mixing $TeO_2$ and a powder of metal which functions of reduce a part of $TeO_2$, such as Al, Cu, Fe or Cr and then heat-treating the mixture at a predetermined temperature. By this evaporation, a mixture of $TeO_2$, Te and Au is formed on the substrate. When the evaporation apparatus having a single evaporation source is used, Au is mixed with the material mentioned above and the mixture, consisting of $TeO_2$, Te and Au, is evaporated from the single evaporation source.

A practical embodiment of the invention will be described below.

EMBODIMENT 1

$TeO_2$, Te and Au were evaporated from respective evaporation sources of a tripple evaporation source type apparatus, onto acrylic resin substrates of 1.1 mm in thickness and 200 mm in diameter rotating at 150 rpm, thus forming an optical disk. The evaporation was conducted under the vacuum of $1 \times 10^{-5}$ Torr to attain a film thickness of 1200Å. The rates of evaporation from respective evaporation sources were varied to adjust the ratio of atoms of Te, O and Au in the recording thin film.

Analysis of compositions of the optical disks thus formed were conducted by using Auger electron spectroscopy (described below as AES). After writing a signal of single frequency of 5 MHz by using a laser power of a level which maximizes the C/N ratio at the completion of recording in a position spaced apart 75 mm from the center of the optical disk rotating at 1800 rpm, the C/N ratio was measured at a moment elapsing 33 msec (period of time required for the optical disk to make one full revolution) after the recording and at another moment elapsing 2 minutes after the recording (before which another moment the recording was completed on the whole disk). In addition, a test was conducted to examine the anti-humid property of the optical disks. The results of the analysis and tests are shown in Table 1 below. The C/N ratio (carrier to noise ratio) is defined by a ratio of carrier signal level to noise level of the same frequency carrier signal measured by spectrum analyser with resolution band width of 30 KHz.

TABLE 1

| Disk No. | Result of AES analysis | | | C/N ratio (dB) after recording | | Moisture-proof property |
|---|---|---|---|---|---|---|
| | Te (at %) | O | Au | 33 msec after | 2 min after | |
| No. 1 | 35 | 59 | 6 | 39 | 39 | o |
| No. 2 | 44 | 55 | 1 | 43 | 47 | o |
| No. 3 | 41 | 51 | 8 | 57 | 57 | o |
| No. 4 | 36 | 46 | 18 | 51 | 51 | o |
| No. 5 | 35 | 42 | 23 | 47 | 47 | o |
| No. 6 | 48 | 49 | 3 | 60 | 60 | o |
| No. 7 | 56 | 42 | 2 | 55 | 56 | o |
| No. 8 | 46 | 42 | 12 | 54 | 54 | o |
| No. 9 | 48 | 37 | 15 | 51 | 51 | o |
| No. 10 | 63 | 35 | 2 | 58 | 58 | o |
| No. 11 | 59 | 33 | 8 | 63 | 63 | o |
| No. 12 | 69 | 30 | 1 | 54 | 57 | o |
| No. 13 | 66 | 20 | 14 | 51 | 51 | Δ |
| No. 14 | 72 | 18 | 10 | 55 | 55 | Δ |
| No. 15 | 73 | 23 | 4 | 58 | 58 | o |
| No. 16 | 78 | 17 | 5 | 58 | 58 | x |
| No. 17 | 67 | 30 | 3 | 62 | 62 | o |
| No. 18 | 68 | 32 | 0 | 50 | 56 | o |
| No. 19 | 61 | 39 | 0 | 47 | 53 | o |
| No. 20 | 48 | 52 | 0 | 40 | 48 | o |

Figure 3:
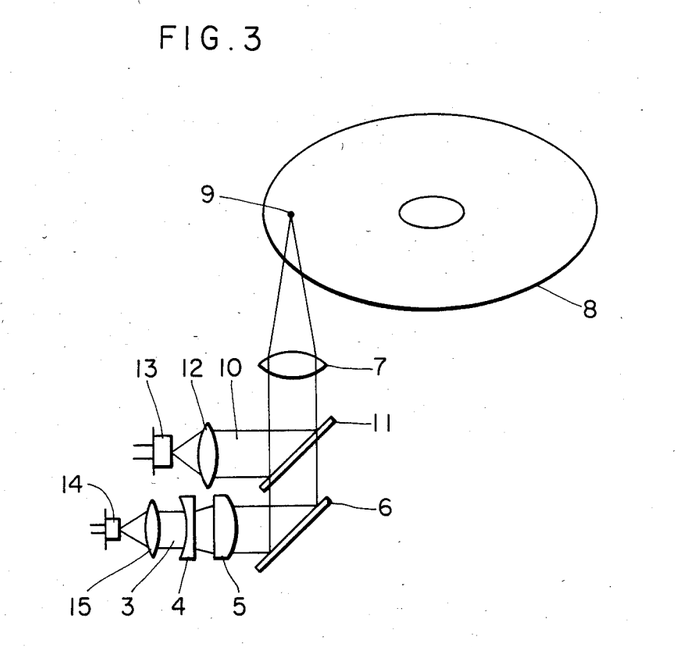
FIG. 3 is a schematic view of an apparatus for recording and reproducing information signals in and out of an optical disk embodying the present invention.

The recording/reproduction test was carried out by means of a system as shown in FIG. 3. The laser beam of a wavelength of 830 nm from a laser diode 14 is altered into a parallel beam 3 by a first lens 15 and is shaped by a second lens 4 into a circular beam and is changed again into parallel beam by a third lens 5. After a conversion of optical axis by a mirror 6, the beam was converged through a half mirror 11 into a spot 9 having a 0.8 μm diameter which is a diffraction limit value on the optical disk, by means of a fourth lens 4. The portions of the recording film on the optical disk 8 irradiated with the circular spot 9 was transformed into black color, thus allowing the recording of information. Thus, by modulation the semiconductor laser, it becomes possible to effect the recording of the signal information on the optical disk.

The detection of the signal was made by a photosensitive diode 13 which receives the light reflected from the optical disk 8 through the half mirror 11 and a lens 12.

In Table 1, the specimens which exhibits greater C/N ratio at 2 minutes elapsing after the recording than at 33 msec elapsing after the recording show that the growth of crystal is still proceeding in these specimens at the moment elapsing 33 msec after the recording, i.e., the recording has not been completed yet at that moment. On the other hand, the especimens in which the C/N ratio at the moment elapsing 33 msec after the recording and the C/N ratio at the moment elapsing 2 min after the recording are the same show that the recording has been completed by the moment elapsing 33 msec after the recording.

The anti-humid test was conducted as follows. Namely, when the specimen optical disks are formed, the recording films were also formed on glass substrates of 18×18×0.2 mm in size. The recording films thus formed on glass substrates were used as the samples for the evaluation of the anti-humid property, and were left in an atmosphere of 50° C. and 90% RH. Samples which did not show any change even in a microscopic observation conducted 10 days after the start of the test are marked by a mark "o". The samples which showed slight changes in the same microscopic observation are marked by a mark "Δ". Samples which were blackened due to the proceeding of the crystallization and samples which exhibited any increase in the transmittance due to oxidation of Te in the film are marked by mark "x".

From Table 1, it will be seen that the samples of the Te-O-Au thin films exhibits C/N ratio values exceeding 50 dB and allows completion of recording within 30 msec elapsing after the irradiation with the laser beam, as well as a good moisture proof property, when the composition falls within the region defined by the lines connecting the points A, B, C and D. In particular, the region defined by lines connecting the points A, B, C and E exhibits a C/N ratio in excess of 55 dB and, hence, is usable most preferably in practical point of view.

The sample Nos. 1 to 20 in Table 1 correspond to points 1 to 20 appearing in FIG. 1.

By way of reference, optical disks having thin films of Te-O-Ag system and Te-O-Cu system were produced by using Ag and Cu in place of Au used in the embodiment of the present invention. A series of tests which were effected under the same conditions as those explained before was conducted on these optical disks, the result of which are shown in Table 2. From this table, it will be seen that the high speed of recording which was attained with the disks containing Au could not be obtained with the disks produced by the addition of Ag or Cu in place of Au.

TABLE 2

| Disk No. | Result of AES analysis (at %) | | | C/N ratio (dB) after recording | | Moisture-proof property |
|---|---|---|---|---|---|---|
| | Te | O | Ag | 33 msec after | 2 min after | |
| No. 21 | 59 | 39 | 2 | 45 | 50 | o |

TABLE 2-continued

| Disk No. | Result of AES analysis (at %) | | | C/N ratio (dB) after recording | | Moisture-proof property |
|---|---|---|---|---|---|---|
| No. 22 | 52 | 43 | 5 | 40 | 43 | o |
| No. 23 | 66 | 27 | 7 | 46 | 52 | o |
| No. 24 | 49 | 37 | 14 | 38 | 44 | o |
| No. 25 | 42 | 36 | 22 | 35 | 39 | o |
| | Te | O | Cu | | | |
| No. 26 | 70 | 27 | 3 | 47 | 52 | Δ |
| No. 27 | 48 | 47 | 5 | 38 | 43 | x |
| No. 28 | 57 | 38 | 5 | 40 | 43 | x |
| No. 29 | 59 | 30 | 11 | 36 | 40 | x |
| No. 30 | 41 | 40 | 19 | 32 | 35 | x |

EMBODIMENT 2

Using an electron beam evaporation apparatus of dual evaporation source type, optical disks were produced by evaporating Au from one of two sources, while evaporating Te and TeO$_2$ from the other source. The evaporation of Te and TeO$_2$ from one evaporation source was conducted in the following way. As the starting material, a mixture containing 85 wt. % of TeO$_2$ and 15 wt. % of Al was formed by using a small amount of alcohol. Then, 25 g of powder of this mixture was put on a quartz boat and was sintered for 2 hours in an electric furnace at 700° C. while supplying N$_2$ gas so as to reduce a part of TeO$_2$. The sintered product was crushed and pressed into pellets which were then evaporated. The evaporation Au was conducted at an evaporation rate of 1Å/S, while evaporation of Te+TeO$_2$ was conducted at the rate of 20 Å so as to form a recording film of 1200 Å on a substrate of an acrylic resin, in the same manner as the Embodiment 1. The recording thin film thus formed was analyzed by AES. As a result, it was confirmed that this recording thin film contains 60 at % of Te, 35 at % of O and 5 at % of Au. By using this optical disk, recording/reproduction test and anti-humid test were carried out under the same condition as in Embodiment 1. The C/N ratio was 62 dB both at the moments elapsing 35 msec and 2 min after the application of the laser beam, thus proving the completion of recording in short period of time. A high anti-humid property ranked by "o" mark was also confirmed.

Embodiment 3

In this embodiment, an evaporation device having a single evaporation source was used. The evaporation for obtaining Te-O-Au thin film from the single evaporation source was conducted in the following way. As the starting material, a mixture containing 60 wt. % of TeO$_2$, 10 wt. % of Al and 30 wt. % of Au was formed by using a small amount of alcohol. Then, 25 g of powder of this mixture was put on a quartz boat and was fired for 2 hours in an electric furnace at 700° C. while supplying N$_2$ gas so as to reduce a part of TeO$_2$ by Al. The fired product was crushed and pressed into pellets which were then evaporated. The evaporation was conducted at an evaporation rate of 20 Å/S so as to form a recording thin film of 1200 Å on a substrate of an acrylic resin, in the same manner as in the Embodiment 1. The recording thin film thus formed was analyzed by AES. As a result, it was confirmed that this recording thin film contains 57 at % of Te, 36 at % of O and 7 at % of Au. Using this optical disk, recording/reproduction test and anti-humid test were carried out under the same condition as in Embodiment 1. The C/N ratio was 60 dB both at the moments elapsing 33 msec and 2 min after the irradiation of the laser beam, thus proving the completion of recording in short period of time. A high anti-humid property ranked by mark "o" was also confirmed.

As will be understood from the foregoing description of the embodiments, the recording thin film of Te-O-Au system as an optical information recording member brings about a remarkable improvement in the recording speed, recording sensitivity and C/N ratio.

The recording thin film of Te-O-Au system, however, is apt to cause the following phenomenon. Namely, when an excessively large recording power is inputted to this type of recording film, there is caused a fear that the recording bits are apt to be distorted or the optical density concentration in the recording bits is apt to become nonuniform. Thus, when optically reproducing the bits, there are caused the fear of a distortion of the reproduced signal and a reduction in the level of C/N ratio, as well as an increase in the secondary higher harmonic, thus imparing the quality of the reproduced signals. In order to obviate this problem, the present inventors propose the following improvement in the Te-O-Au system recording thin film to make the same usable in a wider variety of specification. Namely, the inventors propose to provide a thermal diffusion layer on at least one side of the recording film, the thermal diffusion layer being made of a metal having a higher heat conductivity than the recording film. By providing this thermal diffusion layer, it becames possible to make uniform and stabilize the recording bits. Embodiments of the Te-O-Au recording thin film having such thermal diffusion layer will be described hereinunder.

Figure 4A:
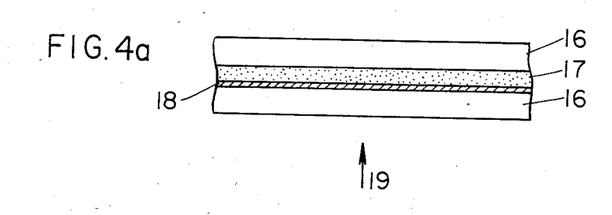
Figure 4B:
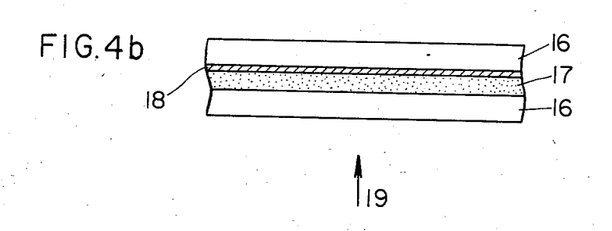
Figure 4C:
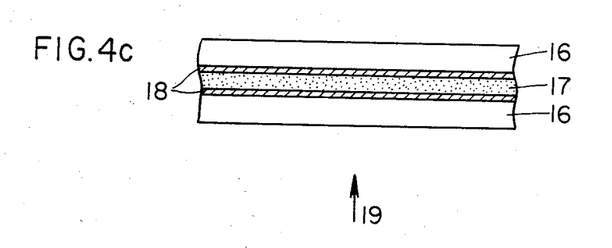

Referring to FIGS. 4a to 4c schematically showing an optical information recording member of the invention, a reference numeral 16 denotes a substrate, 17 a recording layer, 18 a thermal diffusion layer, and 19 the position of a recording light source. More specifically, FIGS. 4a and 4b show embodiments in which the thermal diffusion layer is formed only on one side of the recording layer, while FIG. 4c shows an embodiment in which the thermal diffusion layers are formed on both sides of the recording layer.

Thus, the thermal diffusion layer 18 may be formed on either one side of the recording layer 17 or on both sides of the same. For the purpose of simplification of the production process, however, it is preferred to provide the thermal diffusion layer on only one side of the recording layer. Needless to say, a higher thermal diffusion effect is obtained when the thermal diffusion layers are provided on both sides of the recording layer. When the thermal diffusion layer is provided on only one side of the recording layer, the thermal diffusion layer is preferably formed on the side of the recording layer opposite to the recording light source because, when the thermal diffusion layer 18 is made of a metal, reflectance regarding recording light (i.e. the laser beam) becomes large with the result that the ratio of light reflected without reaching the recording layer 17 becomes large, thus imparing the light absorption and the sensitivity.

The thermal diffusion layer 18 in the optical information recording member of the invention is necessary to have a higher heat conductivity than the recording layer 17. Examples of the materials of the thermal diffusion layer are metals, oxides such as alumina ($Al_2O_3$) and beryllia (BeO), and non-oxides such as BN. Although these materials can be used satisfactorily as the material of the thermal diffusion layer, metals are used most suitably. Among various metals, Au, Al, Ni and Pd are used most suitably, because these metals generally exhibit high resistance to corrosion. In addition, Au, Ni and Pd have high melting points of 1063° C., 1455° C. and 1555° C., respectively, so that these metals are not molten in spite of the heat caused by the laser beam. Although Al has a low melting point of 660° C. and tends to be molten by the heat produced by the laser beam, it is possible to prevent the melting of the Al thermal diffusion layer by making large the thickness of the aluminum layer which is large in heat conductivity. Among the metals described above, Au is a particularly preferable material. That is, the thermal diffusion layer made of Au meets all the requirements described above and the Au layer can be easily formed because the recording layer is made of a composition of Te-O-Au system. The only problem encountered in the use of Au is that the cost of Au is high. Therefore, it is necessary to suitably select the material of the thermal diffusion layer, depending on the conditions.

An explanation will be made hereinunder as to the thickness of the thermal diffusion layer.

The recording thin film of Te-O-Au system usually has a thickness of 1000 to 1200 Å. This thin film thickness is determined such that the difference between the reflectivity before the recording and the reflectivity after the recording is maximized. When the thickness of the recording thin film is smaller than the optimum thickness, the heat capacity of the recording film is reduced so that the amount of change in the reflectivity and the C/N ratio are reduced although the sensitivity is increased. The C/N ratio is reduced also when the thickness of the recording thin film exceeds the optimum thickness. However, since the recording layer consisting of Te, O and Au has inherently large optical change (reflectance variation) measured before and after the recording, it is possible to obtain practically acceptable C/N ratio even if the thickness of the thermal diffusion layer is made smaller than the optimum thickness. Thus, in order to increase the sensitivity, it is possible to reduce the thickness of the thermal diffusion layer. When the recording thin film has a small thickness, the thickness of the thermal diffusion layer can be reduced. Conversely, when the recording thin film has a large thickness, the thickness of the thermal diffusion layer should be increased. Thus, the thickness of the thermal diffusion layer is optimumly determined in accordance with the thickness of the recording thin film. According to the invention, the thermal diffusion layer should have a thickness which ranges between 10 and 80% of the thickness of the recording layer. The required thickness of the thermal diffusion layer, however, varies depending on the material of the thermal diffusion layer. More specifically, in a case of Au, the thickness of the thermal diffusion layer preferably ranges between 15 and 40% of the thickness of the recording film. In the cases of Pd and Ni, the preferred thickness ranges between 10 and 35% of the thickness of the recording film. In a case of Al, the thickness preferably ranges between 35 and 80% of thickness of the recording film. The preferred thickness of the thermal diffusion layer varies also depending on the position of this layer with respect to a light source for recording. Generally, however, the thickness of the thermal diffusion layer is selected to become small within the ranges specified above when the thermal diffusion layer is disposed on the same side of the recording film as the light source. Conversely, when the thermal diffusion layer is provided on the opposite side regarding the light source, the thickness is selected to become large within the ranges specified above. When the thermal diffusion layers are provided on both sides of the recording film, the sum of thicknesses of two thermal diffusion layers should fall within the ranges specified above.

Practical embodiments will be described hereinunder.

Embodiment 4

Figure 5:
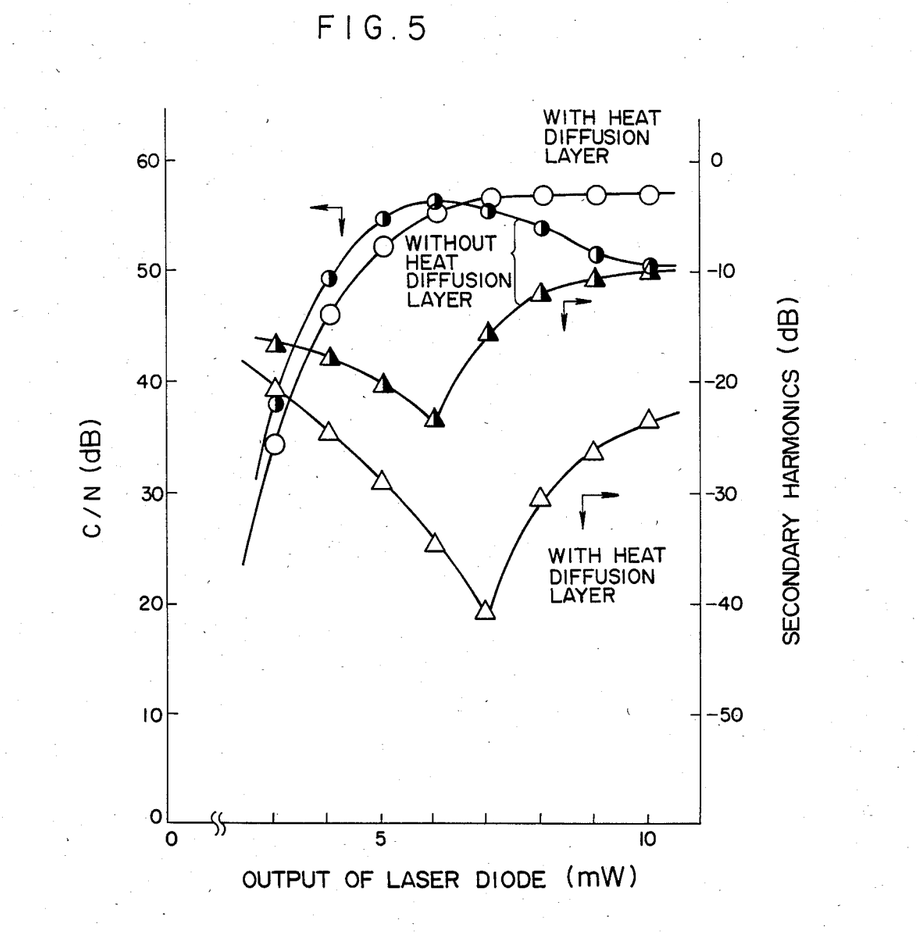
FIGS. 5 and 6 are graphs showing how the C/N ratio and the secondary harmonics related to the output power level of a laser diode.

A mixture consisting essetially of 60 wt. % of $TeO_2$, 10 wt. % of Al and 30 wt. % of Cu was prepared. Then, 30 g of this mixture was sintered for 10 hours at 675° C. to reduce a part of $TeO_2$, thus forming a sintered material of $Te-TeO_2$ system. Al and Cu serve as reducing agents for reducing $TeO_2$. The sintered material was then crushed and pressed to become $Te-TeO_2$ pellets of 3 g. Evaporation was carried out on an acrylic resin substrate by electron beam evaporation method in the same manner as in Embodiment 2. The evaporation apparatus was of the double source type, having one evaporation source for evaporating the $Te-TeO_2$ pellets and the other evaporation source for evaporating Au. The evaporation was conducted at an evaporation rates of 20 Å/S for $Te+TeO_2$ and 2 Å/S for Au, until a film thickness of 1200 Å was obtained. Then, an Au layer of 300 Å as a heat radiation layer was deposited on the surface of the recording layer at an opposite side to the surface which receives the laser beam. The specimens after the deposition were bonded to acrylic resin plates of the same kind as the substrate by means of an UV resin, thus forming disks for test. An AES analysis conducted on the recording film showed that the recording film has a composition comprising 52 at % of Te, 39 at % of O and 9 at % of Au. This composition falls within the region defined by the lines connecting the points A, B, C and D in FIG. 1. The disks thus prepared were subjected to the same test as in Embodiment 1, using such an apparatus for evaluation as shown in FIG. 3. The disk was rotated at a speed of 600 rpm. Recording and reproduction were conducted on an area radially spaced 55 mm from the center of the disk, by means of laser diode beam (wavelength being 830 nm) modulated at a single frequency of 0.875 MHz. The results of the test are shown in FIG. 5. In this Figure, the axis of abscissa represents the power of the laser beam (wavelength $\lambda=830$ nm) as measured at the point designated by 9 in FIG. 3. From this Figure, it will be understood that the reduction in the C/N ratio attributable to the distortion of the bit is supressed even if the laser input power is increased, provided that a thermal diffusion layer is formed on the recording film. It will be seen also that the SH (secondary harmonics) level of the signal is sufficiently low. In this FIG. 5, the samples shown as "without thermal diffusion layer" refer to such disks as having the same conditions as those "with thermal diffusion layer" with the exception of having no thermal diffusion layer made of Au.

Embodiment 5

Figure 6:
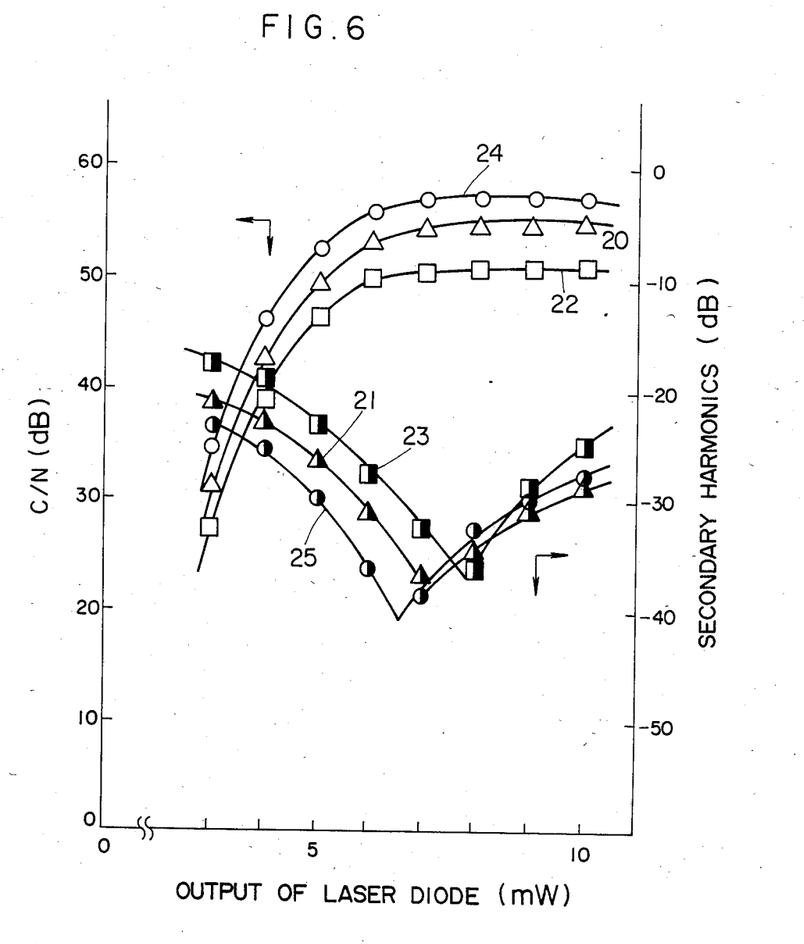
Figure 7:
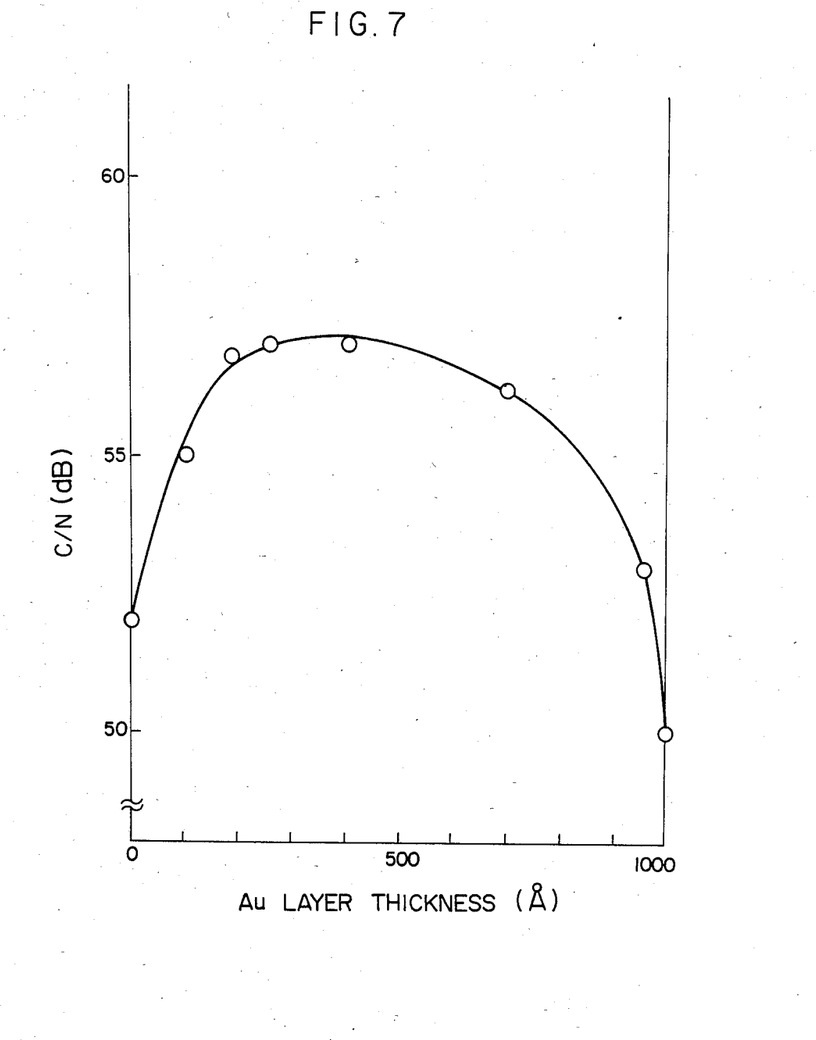
FIGS. 7 and 8 are graphs showing the relationship between the thickness of a thermal diffusion layer and the C/N ratio.

Samples were produced by depositing thermal diffusion layers of Ni, Pd and Al with thicknesses of 250, 300 and 700 Å, respectively, in place of the Au layer on the sample disks used in Embodiment 4. These sample disks showed recording characteristics as shown in FIG. 6. In this FIG. 6, curves 24 and 25 show the C/N ratio and SH value of the sample disk having the thermal diffusion layer of Pd. Similarly, curves 20 and 21 show the C/N ratio and SH (Secondary Harmonics) value of the sample disk having the thermal diffusion layer of Ni, while curves 22 and 23 show those of the sample disk having an Al thermal diffusion layer.

Embodiment 6

Sample disks were formed in the same way as Embodiment 4, with the thickness of the Au thermal diffusion layer varied as 100, 180, 250, 400, 700, 960 and 1000 Å. The C/N ratio was measured with these sample disks by using a laser beam of an output level of 9 mW. When the thickness of the Au layer is below 180 Å, i.e., when the thickness is below 15% of the thickness (1200 Å) of the recording layer, the waveform is distorted to lower the C/N ratio, because the thermal diffusion layer having such a small thickness cannot exert sufficient thermal diffusion effect. The C/N ratio is reduced also when the thickness of the thermal diffusion layer exceeds 960 Å which is 80% of the thickness of the recording film, because the heat produced by the laser beam is excessively diffused in the Au thermal diffusion layer. From this fact, it is understood that the thickness of the Au thermal diffusion layer preferably ranges between 10 and 80% of the recording film thickness, i.e., between 120 and 960 Å, more preferably between 15 and 40%, i.e., between 180 and 480 Å.

Embodiment 7

Figure 8:
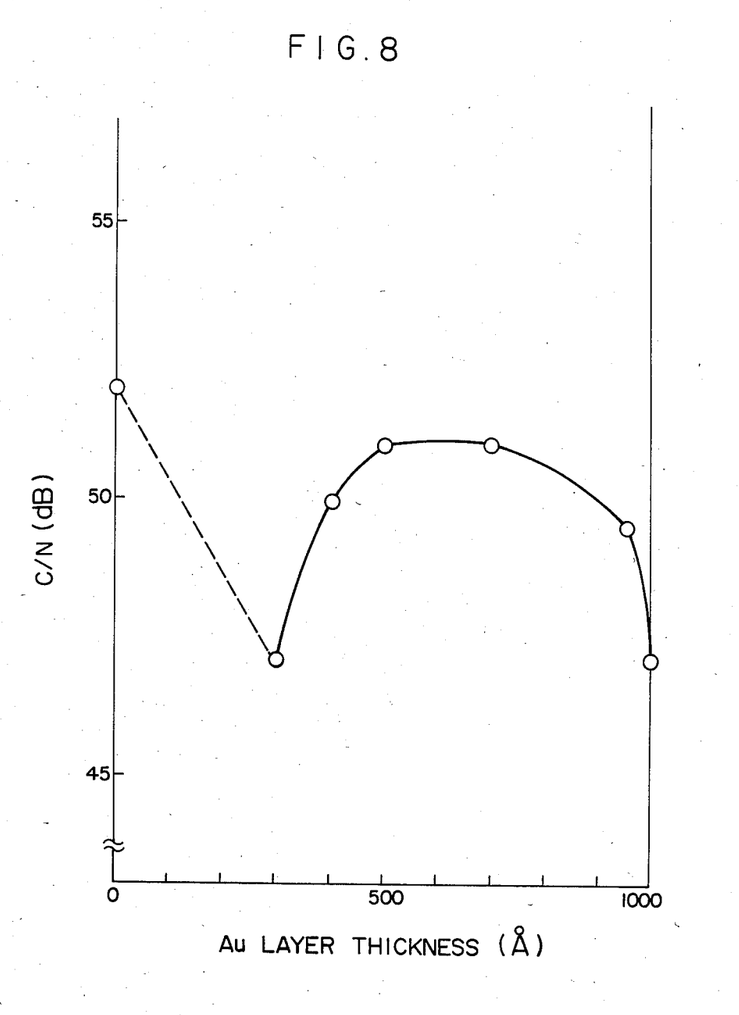

Sample disks were formed in the same way as Embodiment 4 except that Al was used as the material of the heat thermal diffusion layer, the thickness of which was varied as 300, 400, 500, 700, 960 and 1000 Å. Tests were conducted in the same manner as in Embodiment 6, with the results shown in FIG. 8. From this FIG. 8, it will be understood that the C/N ratio in the disks having the Al thermal diffusion layer is generally low as compared with the case where no thermal diffusion layer is provided. This can be attributed to a fact that a part of Al is dissolved in the recording film. When Al is used as the material of the thermal diffusion layer, the thickness of this thermal diffusion layer preferably ranges between 400 and 960 Å, which amounts to about 35 to 80% of the recording film thickness.

As has been described, according to the invention, there is provided an optical information recording member made by adding a small amount of Au in a conventional TeOx thin film while limiting the ratio of atomic numbers of Te, O and Au to a specific range. In the optical information recording member of the invention, the information can be recorded at a speed much higher than that obtained with the conventional optical information recording member having a TeOx film and, therefore, can be used suitably as the memory for computer which require the ability to reproduce signals immediately after the recording.

The optical information recording member of the invention is superior to the conventional optical information recording member having TeOx film not only in the recording speed but also in other aspects such as recording sensitivity and C/N ratio, as well as in the anti-humid property.

According to a specific form of the invention, a thermal diffusion layer of a metal, having a heat conductivity higher than that of the recording film of Te-O-Au system, is provided on at least one side of the recording film. This thermal diffusion layer makes uniform and stabilize the recording bits, and suppresses the distortion of the recording bits even when a excessively large recording power is irradiated, thus making it possible to use the recording disk with a wider scope of specification.

What is claimed is:

1. An optical information recording member comprising a thin film capable of optically recording and reproducing information, said thin film comprising at least Te and O in a mixture of $TeO_2$ and Te and Au, the ratio of contents of Te, O and Au in atomic percent falling within the region defined by lines connecting points A, B, C and D in FIG. 1.

2. An optical information recording member according to claim 1, wherein a part of o exists at least in the form of $TeO_2$ which is an oxide of Te.

3. An optical information recording member according to claim 1, wherein the contents of Te, O and Au are selected to fall within the region defined by lines connecting the points A, B, C and E in FIG. 1.

4. An optical information recording member comprising an optical recording thin film comprising at least Te and O in a mixture of $TeO_2$ and Te and Au, and a thermal diffusion layer made of a metal and formed on at least one side of said recording thin film.

5. An optical information recording member according to claim 4, wherein said thermal diffusion layer is made of a metal selected from a group consisting of Au, Al, Ni and Pd.

6. An optical information recording member according to claim 4, wherein said thermal diffusion layer is provided on the side of said recording film opposite to the side which is irradiated with the light from a recording light source.

7. An optical information recording member according to claim 4, wherein said thermal diffusion layer is made of Au.

8. An optical information recording member according to claim 4, wherein said thermal diffusion layer has a thickness in a range between 10 and 80% of the thickness of said recording film.

9. An optical information recording member according to claim 7, wherein said thermal diffusion layer has a thickness in a range between 15 and 40% of that of said recording film.

* * * * *